March 8, 1955 R. H. WRIGHT ET AL 2,703,694
VENETIAN BLIND BRACKET UNIT
Filed April 11, 1950 3 Sheets-Sheet 1
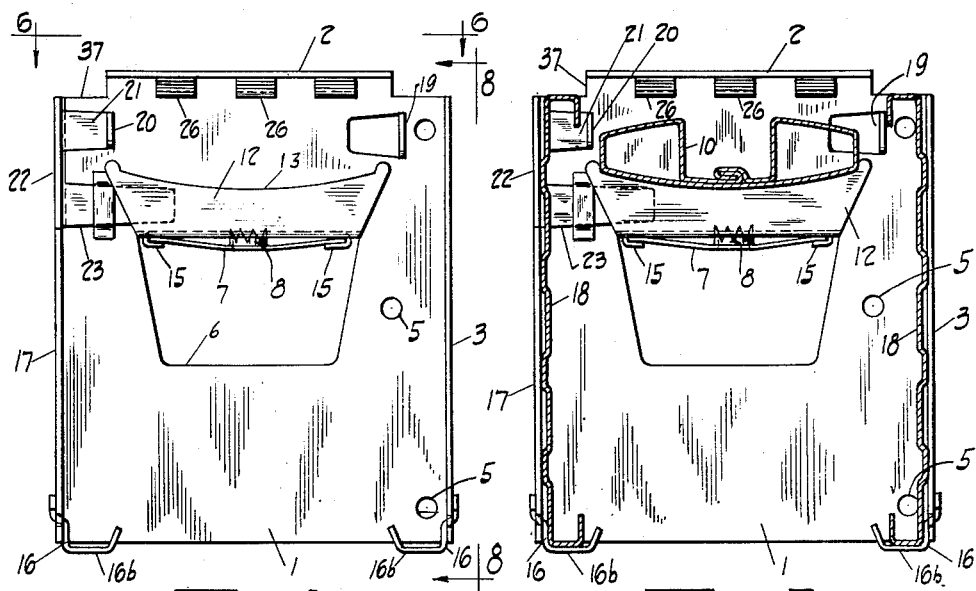
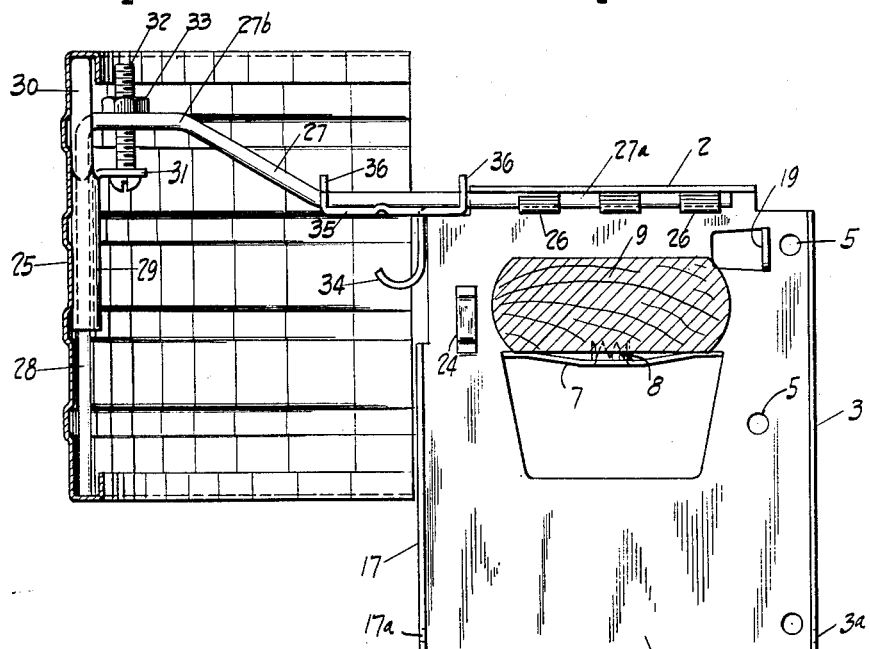
INVENTOR.
R. H. Wright & A. Zay
BY Robb & Robb
Attorneys March 8, 1955
R. H. WRIGHT ET AL
2,703,694
VENETIAN BLIND BRACKET UNIT
Filed April 11, 1950
3 Sheets-Sheet 2
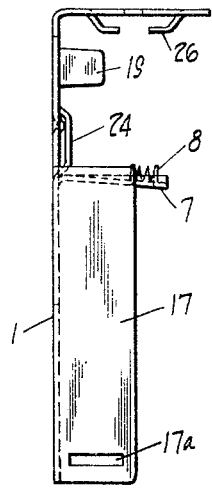
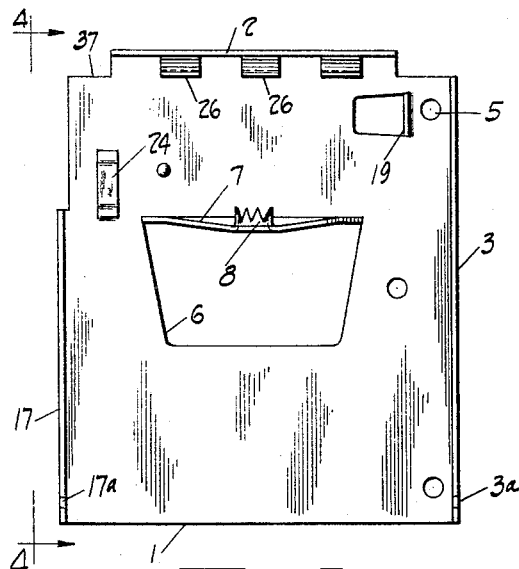
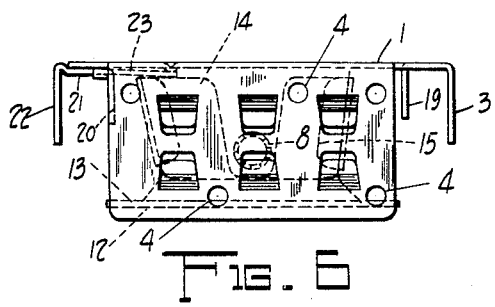
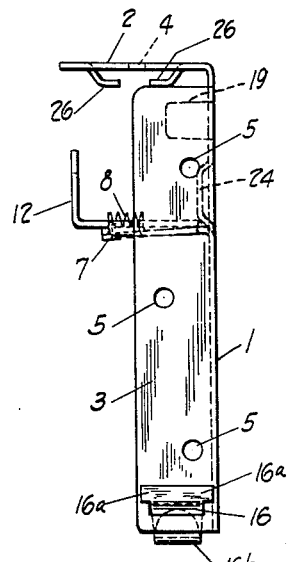
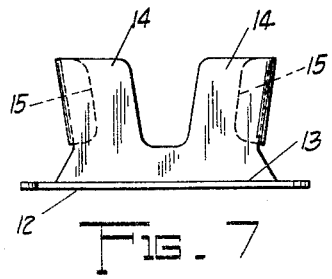
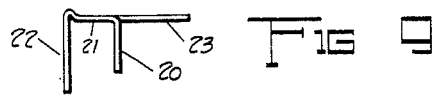
INVENTOR.
R. H. Wright & A. Zay
BY Robb & Robb,
Attorneys March 8, 1955  R. H. WRIGHT ET AL  2,703,694
VENETIAN BLIND BRACKET UNIT
Filed April 11, 1950  3 Sheets-Sheet 3
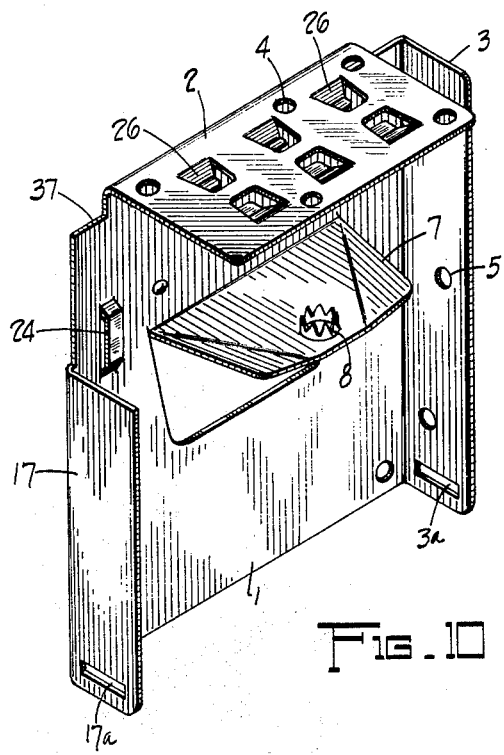
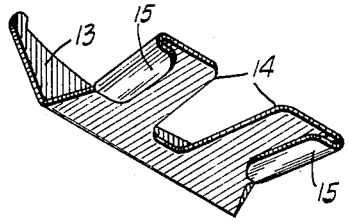
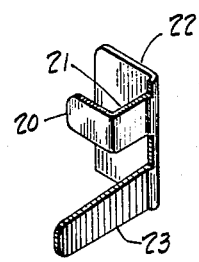
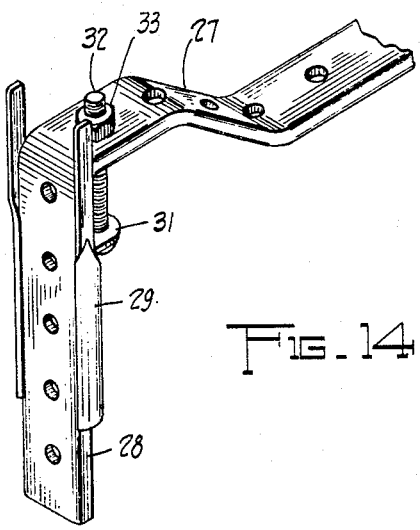
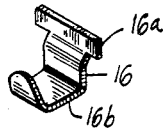
INVENTOR.
R. H. Wright & A. Zay
BY Robb & Robb,
Attorneys United States Patent Office 2,703,694
Patented Mar. 8, 1955

2,703,694

VENETIAN BLIND BRACKET UNIT

Richard H. Wright, Bratenahl, and Anthony Zay, Cleveland, Ohio, assignors to The Guarantee Specialty Manufacturing Company, Cleveland, Ohio, a corporation Application April 11, 1950, Serial No. 155,262

6 Claims. (Cl. 248—264)

This invention pertains to the art of Venetian blind hardware and comprises a novel type of supporting bracket construction with combination equipment therefor, said bracket construction including a main bracket attachment to be carried by a window frame for supporting one end of the head rail of a Venetian blind, the coacting equipment or provisions of said bracket including an attachable shelf unit whereby to convert the main supporting bracket from one especially adapted to carry a wooden head rail to one suitable for supporting a metal head rail.

By the means last mentioned above a bracket unit of the invention may be utilized in conjunction with a head rail of the common metal type now being largely manufactured as well as for wood head rails which are of different shape, generally speaking.

Additional to the foregoing, the bracket equipment of this invention includes a hanger bar attachable to the top hanger flange by which the bracket is secured to the window, said hanger bar being utilized, when desired, to support a drape and facia, or facia alone. For the last mentioned purpose the said hanger bar is provided with a detachable curtain rod hook removable therefrom when not desirable to use but which when employed will support one end of a curtain rod. On the hanger bar also is carried adjustable facia engaging means for securely holding in place a facia at an end thereof in supported relation to the bracket, and spaced some distance inwardly from the window frame from a Venetian blind carried by the bracket.

Another feature of the invention lies in provisions at the front and rear portions of the main bracket or fixture of holding devices for front and rear facia members directly to be carried by the front and rear portions of the bracket structure, some of the holder means being detachable from a permanent portion of the main bracket.

This invention comprises other detailed features of construction of a more minor nature, supplemental to those above referred to, and which will be understood more fully upon reference to detail description found hereinafter.

Full understanding of the invention will be had upon reference to the following description and to the following drawings and in the latter:

Figure 1 is a view in front elevation of a main supporting bracket for Venetian blinds, embodying the invention, the removable metal head rail support member being shown in position on the shelf of the bracket which ordinarily supports a wooden head rail.

Figure 2 is a view similar to Figure 1 with the metal head rail in position upon its supporting member attached to the bracket in the manner shown in both Figures 1 and 2. Figure 2 also illustrates a front and rear facia mounted directly upon the main bracket by means of certain removable clip members and a single non-detachable facia engaging member.

Figure 3 is a view similar to Figure 1 in respect to the showing of the main bracket but illustrating a wooden head rail mounted upon its supporting shelf and interlocked with the latter against displacement, this view likewise illustrating the cover plate located at the upper lefthand corner of the bracket in Figures 1 and 2, removed for enabling the mounting on the bracket of the attachable hanger bar in inter-locking engagement with the hanger flange of the bracket. In this view the hanger bar is shown as supporting the curtain rod hook, a part detachable therefrom, if not desired to support a curtain rod, and the outer end of the hanger bar being shown supporting the facia by special adjustable engaging means on the free extremity of the said hanger bar.

Figure 4 is a front end view of the main bracket, looking in the direction of the arrows 4—4 in Figure 5.

Figure 5 is a view somewhat similar to Figure 1 showing the main bracket structure alone as to the various integral parts thereof, the attachment features such as illustrated in Figures 1 and 2 being omitted and the head rail shelf shown more clearly than in the other figures.

Figure 6 is a top plan view of the main bracket bringing out clearly the disposition of the top hanger flange and the rear hanger flange, and the formation of the downwardly struck projections from the top hanger flange, which latter are used to hold the detachable hanger bar in place in the manner shown in Figure 3.

Figure 7 is a detail view of the metal head rail supporting member alone, said supporting member shown in Figures 1 and 2 as when attached to the main bracket.

Figure 8 is a rear end view of the main bracket with the parts thereon as illustrated in Figure 1 and looking in the direction of the arrows 8—8 of Figure 1.

Figure 9 is a detail view of the detachable cover plate and facia clip member located at the upper lefthand corner of the main bracket as seen in Figures 1 and 2.

Figure 10 is a perspective view of the main bracket, largely as seen in Figure 5 but with the detachable cover plate and facia clip unit partially displaced forwardly from the bracket to clearly illustrate its construction and assembly position.

Figure 11 is a perspective view of the attachable metal head rail supporting member and, Figure 12 is a perspective view of the front cover plate and clip member.

Figure 13 is a perspective view of one of the facia clips at the lower corners of the bracket plate.

Figure 14 is a fragmentary perspective view of the outer end of the drape supporting bar and clamp device thereon.

It will be seen, upon reference primarily to Figures 1 and 5, that the novel main bracket or fixture of this invention comprises a body 1, in the form of a flat plate, having the right-angle top hanger flange 2 at its upper end and the right-angle rear hanger flange 3 at its back end, each of these flanges being provided with suitable openings 4 and 5 respectively through which screws may be passed for attaching the main bracket to the top of the window frame when the flange 2 is employed to support the bracket and attaching the flange 3 to the side of the window frame when the bracket is itself supported by means of said flange 3.

Struck out of the material of the body 1 of the bracket, forming an opening 6, is a shelf member 7 extending inwardly at substantially right angles to the plane of the bracket body 1 and this flange is provided with an opening by punching upwardly the material thereof to provide the anchoring teeth 8 near the outbent edge of the shelf, the shelf being slightly bellied downwardly near its outer edge and middle portion preferably. The purpose of the teeth 8 which are circularly arranged, is to engage the under side of a wooden head rail 9 to become sunk in the body of the rail for preventing shifting or accidental movement of the rail once it is placed in supported relation upon the shelves 7 of two bracket units now being described as to individual structure.

In order that the present bracket unit may be employed not only for wood head rails 9, but also for supporting metal head rails of a conventional type, as shown at 10 in the drawings, I provide an attachable metal head rail supporting member or auxiliary shelf member in the form seen in Figures 1, 2, 5, 7 and 11 particularly. This auxiliary shelf or supporting member designated 12 consists of a plate formed with an arc shaped cut-out 13 in its upper edge that conforms to the under side shape of the head rail 10 and provides a seat to engage and support one end of said head rail. The shelf member 12 is detachably engaged with the wood head rail shelf member 7 by providing on the member 12 laterally extending arms 14 with downwardly and inwardly curved flanges 15 on the outer edges of the arms 14. Said outer edges diverging slightly as they extend from the body of the member 12. The divergence corresponding with the degree of divergence of the front and rear edges of the shelf 7. Thus the auxiliary shelf or supporting member 12 may be considered to be engaged with the front and rear edge portions of the shelf 7 by sliding the arms 14 over the shelf with the flanges 15 engaged beneath so as to frictionally hold the member 12 in place on the shelf 7. The member 12 for each main bracket 1 will only be used when a metal head bar is to be supported on the bracket, of course.

Now, as seen in Figure 2 of the drawings, front and rear facias or facia boards are designed to be mountable upon a main bracket 1 of the present invention and for this purpose, when and only when such facias are used, it is contemplated to employ detachable bottom facia clips or holding members 16 mountable upon the lower end portion of the bracket 1. For this purpose the rear mounting flange 3 at its lower end is formed with a horizontal slot 3a, and a front flange 17 extending from the front edge of the bracket 1 and corresponding with the width of the flange 3 generally, is also provided with a horizontal slot 17a opposite the slot 3a. The facia clips or holding members 16 have the bodies thereof formed at the outer upper ends each with horizontal projections 16a and said bodies are adapted to be passed through the slots 3a and 17a so as to hang down from the inner sides of the flanges 3 and 17 respectively. The arms of the bodies extending laterally and seen to be in horizontal positions in Figures 1 and 2, form rest parts 16b on which the lower edges of the facias 18 may be supported. As illustrated, the facias 18 are metal facias but thin wooden facias could be used if desired in substitution for the metal type. The upper end of the rear facia 18 is held in position by a lug 19 stamped out of the body metal of the bracket 1 and spaced from the flange 3.

The upper end of the front facia 18 is held in place by means of a projection 20 extending inwardly from an arm 21 on a cover plate 22 at the upper left-hand corner of the bracket 1. The cover plate 22 is a detachable cover plate for purposes to be hereinafter referred to and is held in place normally by means of an attachment arm 23 integral with the body of the plate, spaced from the lug 20 below the same, and adapted to pass through a retaining loop or coupler 24 which is struck out from the body of the plate 1 as seen best in Figures 4 and 5. The cover plate 22 virtually constitutes a continuation upwardly of the upper end of the front flange 17 of the bracket 1 and provides with the flange 17 a finished continuous surface for the front portion of the bracket when the bracket is placed in position upon the window frame and when no drape and curtain rod supporting bars are used in conjunction with the bracket 1, as illustrated in the manner shown in Figure 3.

The little facia supporting clips or holding members 16 may be readily placed in position or removed by rocking the same properly and introducing the parts 16b into, or pulling these parts out of the slots 3a and 17a respectively. It is evident that the members 16 interlock with the parts 3 and 17 when supported thereon.

With the main bracket structure as herein before described, it is ofttimes desirable to employ supporting means for a drape or facia such as indicated at 25 in Figure 3; also, it is desirable at times to have curtain rod supporting means mounted upon the bracket 1. With the foregoing in view, there are provided on the top mounting flange 2 of the bracket 1 down struck spaced projections 26 formed so as to extend toward each other to provide a space between the lower ends and the body of the flange 2. In this space, and adapted to be held in place by engagement between the parts 26 and 2, a drape and curtain rod supporting bar or arm 27 may be mounted. The bar 27 includes a main horizontal portion 27a adapted by sliding movement to be moved endwise into the space between the parts 26 and 2, see Figure 8, the outer portion of the bar inclining upwardly and then extending horizontally at 27b and being bent sharply downward or at right angles to provide the facia engaging vertical member 28. On the member 28 is mounted a sleeve 29 having upwardly extending clamping arms 30 at opposite sides thereof, the upper extremities of said arms being engageable between the top U-flange of the facia 25. The rear extremity of the engaging member 28 of the bar 27 engages the lower back flange of the facia 25. The sleeve 29 has a lateral projection 31 through which a screw 32 may pass, said screw passing through an opening formed in the outer portion of the bar 21 and receiving the nut 33. The screw 32 is a clamping screw which when tightened up pulls down on the outer end of the bar 27 and up on part 31 of the sleeve 29 to engage the arms 30 of the sleeve with the upper edge or flange of the facia 25 and the lower end of the engaging member 28 with the lower edge or flange of the facia 25.

The facia 25 illustrated in the drawings would, of course, be supported at one end by the bar 27 carried by one of the brackets 1 on one side of the window frame and at the other end by a similar bar and adjuncts carried by a separate bracket at the opposite side of the window frame.

When curtains are to be arranged in front or inwardly of the Venetian blind supported on the bracket unit of this invention, a curtain rod is desirably used and as a suitable mounting means for such a rod there may be carried detachably upon the bar 27 a curtain rod hook 34 which extends downwardly from a supporting plate 35, being struck down from the body of such plate by stamping action preferably. The opposite ends of the plate 35 are upturned to provide loops 36 to receive and hang upon the middle portion of the bar 27. In other words, the plate 35 and its rod hook 34 may be slid on and off the inner horizontal portion 27a of the bar 27, disposed on the bar when a curtain rod is to be supported and not carried by the bar if curtain rod equipment is not desired. The inner end of the plate 35 adjacent to the inner loop 36 is adapted to rest in a cut-out portion at the upper left-hand portion of the bracket designated 3 when the curtain rod carrying member 35 is used.

The foregoing sets forth the construction of the main bracket 1 and the various auxiliary features of this bracket whereby the same may be employed for mounting thereon of either a wood head rail or a metal head rail. Also, in summary, the manner in which the bracket may be utilized by means of the members 19, 16 and 20, to support front and/or rear facias 18 when such facias, one or both, are desired to be carried by the bracket, is fully presented above. In addition, if the facias 18 are not utilized and the facia 25 employed, say in lieu of the front facia 18, the bracket equipment includes the members 27, 28, and 29, for cooperative mounting of the facia 25.

Likewise, should it be desired to employ curtains in addition to the Venetian blind mounted upon two of the brackets 1, the attachable curtain hooks 34 may be mounted on the bars 27 before sliding the same into engagement with the members 26 and 2 of like brackets 1. When the facias 18 are not employed the supporting clips or holding members 16, of course, are not used and therefore may be dispensed with under such conditions.

It will be seen that a bracket structure such as hereinbefore set forth is versatile in characteristics such as to enable it to be employed in different ways for different purposes by reason of the cooperation of certain adjuncts or auxiliary parts that have been fully described above.

Having thus described our invention, what we claim as new and desire to secure by Letters Patent of the United States is:

1. In a bracket unit for Venetian blinds, in combination, a bracket plate having a mounting member attachable to a window frame, said mounting member being formed with a permanently fixed lateral shelf member for supporting a wood head rail with its end confined in the bracket, and a second shelf member detachably engaged with the first shelf member, and shaped to fit a metal head rail to confine an end of the latter within the bracket, the second shelf member being removable from the first shelf member when the latter is to be used to support a wood head rail.

2. In a bracket unit for Venetian blinds, in combination, a bracket plate having a mounting member attachable to a window frame, and shelf supporting means carried by the bracket plate including a fixed shelf member and a removable shelf member, supported on the fixed shelf member one of said shelf members being shaped to support a wood head rail and the other shelf member shaped to support a metal head rail.

3. In a bracket unit for Venetian blinds, in combination, a bracket plate having a mounting member attachable to a window frame, a wooden head rail supporting shelf member formed integrally with said bracket plate, and a second head rail supporting shelf member detachably mounted on the first shelf member, and shaped to support a metal head member at one end within the confines of the bracket plate.

4. In a bracket unit for Venetian blinds, in combination, a bracket plate having a mounting member attachable to a window frame, a head rail supporting shelf member formed integrally with said bracket plate, and a second head rail supporting shelf member detachably mounted on the first shelf member, one of said shelf members having a projection adapted to enter the body of a wood head rail, and the other shelf member having an arcuate seat to supportingly receive a metal head rail, above and not engaged with said projection.

5. A bracket unit as claimed in claim 1, in which one of said shelf members is provided with flange parts to interlock with the other shelf member.

6. In a bracket unit for Venetian blinds, in combination, a bracket plate having a mounting member attachable to a window frame, a head rail supporting shelf member formed integrally with said bracket plate, and a second head rail supporting shelf member detachably mounted on the first shelf member, one of said shelf members having a projection adapted to enter the body of a wood head rail, and the other shelf member having an arcuate seat to supportingly receive a metal head rail, one of said shelf members comprising an integral struck out section of the bracket plate, located between the upper and lower edges of the plate.

References Cited in the file of this patent

UNITED STATES PATENTS

| Number | Name | Date |
|---|---|---|
| 2,200,510 | Lorentzen | May 14, 1940 |
| 2,272,956 | Stuber | Feb. 10, 1942 |
| 2,429,446 | Albrecht | Oct. 21, 1947 |
| 2,483,475 | Royer | Oct. 4, 1949 |
| 2,498,067 | Chatfield | Feb. 21, 1950 |
| 2,515,067 | Wright et al. | July 11, 1950 |
| 2,524,711 | Nelson | Oct. 3, 1950 |
| 2,568,001 | Harris | Sept. 18, 1951 |
| 2,579,578 | Ganter | May 20, 1952 |